United States Patent [19]

Hertel

[11] 3,922,270
[45] Nov. 25, 1975

[54] PROCESS FOR THE PREPARATION OF ACID NITRO DYESTUFFS

[75] Inventor: Hasso Hertel, Muhlheim am Main, Germany

[73] Assignee: Hoechst Aktiengesellschaft, Frankfurt am Main, Germany

[22] Filed: Jan. 29, 1974

[21] Appl. No.: 437,697

[30] Foreign Application Priority Data
Feb. 2, 1973 Germany............................ 2305048

[52] U.S. Cl..................... 260/396 R; 8/12; 8/12.5
[51] Int. Cl.$^2$....................................... C07C 143/58
[58] Field of Search....................... 260/396 R; 8/12

[56] References Cited
UNITED STATES PATENTS
2,107,941   2/1938   Hess et al........................ 260/396 R Primary Examiner—Vivian Garner
Attorney, Agent, or Firm—Connolly and Hutz

[57] ABSTRACT

An improved process for the preparation of acid nitro dyestuffs by the condensation of benzoquinones with aminonitrodiphenylaminesulfonic acids in the presence of manganese dioxide, and the dyestuffs so obtained which have an improved fastness to light, to water and to water drops and an improved tanning effect as compared with the known acid nitro dyestuffs.

1 Claim, No Drawings

PROCESS FOR THE PREPARATION OF ACID NITRO DYESTUFFS

The present invention relates to an improved process for the preparation of acid nitro dyestuffs.

It is known from German Pat. Specification No. 414,390 that brown dyestuffs are obtained by the condensation of benzoquinones with aminonitrodiphenylaminesulfonic acids, which dyestuffs are suitable for dyeing leather and wool. Amont these dyestuffs, especially the condensation product of toluquinone and 4-amino-2-methyl-4'-nitrodiphenylamine-2'-sulfonic acid which is known under the name of "Saurelederbraun (Acid Leather Brown) EGB," has a great technical importance (cf. Color Index 3rd edition 1971, C.I. 10415).

This dyestuff is prepared by condensing 1 mol of toluquinone with 2 mols of 4-amino-2-methyl-4'-nitrodiphenylamine-2'-sulfonic acid in the presence of sodium carbonate, i.e. in the alkaline range, and in the presence of manganese dioxide (cf. BIOS 1548, page 70). The dyestuff so prepared dyes leather in yellowish medium brown shades.

Now, it was found that darker and faster dyestuffs can be obtained when the condensation of the benzoquinones with the aminonitrodiphenylaminesulfonic acids in the presence of manganese dioxide is effected in the acid range at pH values ranging from about 3 to 6.

The process is carried out in such a manner that 1 mol of the benzoquinone is condensed with 2 mols of an aminonitrodiphenylaminesulfonic acid in aqueous solution in the presence of manganese dioxide at pH values between about 3 and 6, the dyestuff is salted out, filtered with suction and dried.

The improved process of the invention preferably refers to the reaction of 1 mol of a benzoquinone of the general formula (1)

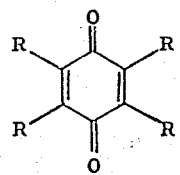
(1)

in which the radical R are identical or different and each represents a hydrogen atom, an alkyl group, especially an alkyl group having from 1 to 4 carbon atoms, or a chlorine atom, with 2 mols of a compound of the general formula (2)

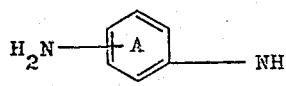

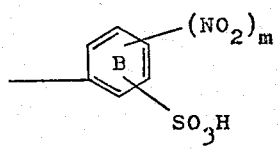
(2)

in which $m$ is 1 or 2 and the benzene nuclei A and B may be substituted by chlorine, bromine, a lower alkyl, preferably a methyl, ethyl, a lower alkoxy, preferably a methoxy or ethoxy group, in aqueous solution in the presence of manganese dioxide at pH values between 3 and 6.

Suitable benzoquinones are, especially, 1,4-benzoquinone, 2-alkyl-1,4-benzoquinones, 2,5- or 2,6-dialkyl-1,4-benzoquinones or chloranile, in which case the alkyl groups preferably contain 1, 2, 3 or 4 carbon atoms.

Suitable aminonitrodiphenylaminesulfonic acids are, for example, 4-amino-4'-nitrodiphenylamine-2'-sulfonic acid, 4-amino-2'-nitrodiphenylamine-4'-sulfonic acid, 4-amino-2',4'-dinitrodiphenylamine-6'-sulfonic acid, 4-amino-2',6'-dinitrodiphenylamine-4'-sulfonic acid, 3-amino-4'-nitrodiphenylamine-2'-sulfonic acid, which may also be substituted by halogen atoms, especially chlorine or bromine atoms, alkyl or alkoxy groups, especially those which contain 1 to 4 carbon atoms in the alkyl radical.

The dyestuffs obtainable in accordance with the invention show, as compared with the known dyestuffs having the C.I. No. 10 415, a darker more greenish or bluish shade on leather and have an improved fastness to light, to water and to water drops and an improved tanning effect.

The following examples serve to illustrate the invention, the parts are by weight, unless otherwise stated:

EXAMPLE 1:

300 Parts of 4-amino-4'-nitro-diphenylamine-6'-sulfonic acid were stirred with 1500 parts of water. By adding sulfuric acid of 78 % strength the pH was adjusted to 3.5. After heating to 50°C 73 parts of toluquinone (2-methyl-1,4-benzoquinone) and 100 parts of 90 - 95 % manganese dioxide were introduced.

By adding sulfuric acid of 78 % strength the pH value was maintained at 3.5. After 4 hours, the temperature was raised to 95°C and the excess toluquinone was eliminated from the mixture by steam distillation. The mixture was clarified while hot and the dyestuff was salted out at 40°C with 20 percent by volume of sodium chloride, it was filtered with suction, dried and ground. It dyed leather in deep olive-green shades.

EXAMPLE 2:

It was carried out in the same manner as described in example 1, the pH being maintained at 5 with glacial acetic acid. The dyestuff so obtained dyed leather in brown shades having an olive tinge.

EXAMPLE 3:

A solution of

345 Parts of 4-amino-4'-nitro-3-methyl-diphenylamine-6'-sulfonic aacid as sodium salt in about 2 liters of water which was obtained by the condensation of the sodium salt of 4-chloro-1-nitro-benzene-5-sulfonic acid with 2,5-diamino-tulene in the presence of sodium bicarbonate as acid-binding agent, was adjusted to pH 4 with sulfuric acid of 78 % strength. The sulfonic acid yielded a fine precipitate. At a temperature of 60°C 67 parts of toluquinone and 100 parts of 90-95 % manganese dioxide were introduced. The pH value now began to rise. It was adjusted at 4 by adding dropwise sulfuric acid of 78 % strength. After about 2 hours the reaction was finished in general, which could be seen from the constant pH. 5 hours after having added the manganese dioxide, the temperature was raised to 95°C and the excess toluquinone was eliminated from the reaction mixture with steam. The mixture was clarified in the hot state and salted out at 40°C with 20 % by volume of sodium chloride. The precipitated dyestuff was filtered with suction, and dried at 60°C in the circulating air cabinet. It dyed leather in dark brown shades having a violet tinge.

EXAMPLE 4:

It was carried out in the same manner as example 3, however, the pH was 6. The dyestuff obtained dyed leather in a neutral medium brown.

The following table gives a list of further dyestuffs obtained in accordance with the invention and the shades which they yield upon dyeing leather.

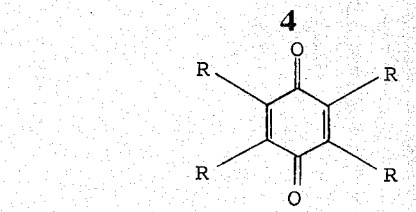

in which the R is identical or different and each is hydrogen, alkyl of 1 to 4 carbon atoms or chlorine, with 2 mols of a compound of the formula

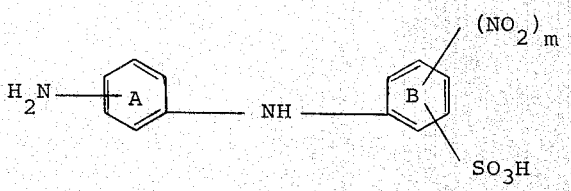

TABLE

| Example No. | Benzoquinone | Amine component | pH-value | Shade |
|---|---|---|---|---|
| 5 | 1,4-benzoquinone | 4-amino-4'-nitro-diphenyl-amine-6'-sulfonic acid | 3.0 | olive green |
| 6 | '' | '' | 5.0 | olive brown |
| 7 | 2,5-dimethyl-1,4-benzoquinone | '' | 6.0 | medium brown |
| 8 | 2-ethyl-1,4-benzoquinone | '' | 6.0 | medium brown |
| 9 | 2-isopropyl-1,4-benzoquinone | '' | 6.0 | medium brown |
| 10 | 2-methyl-1,4-benzoquinone | 4-amino-2'-nitro-diphenyl-amine-4'-sulfoninc acid | 5.0 | green brown |
| 11 | 2-methyl-1,4-benzoquinone | 4-amino-2'-nitro-diphenyl-amine-4'-sulfonic acid | 3.5 | green brown |
| 12 | '' | 4-amino-2',4'-dinitro-diphenylamine-6'-sulfonic acid | 5.0 | dull brown |
| 13 | '' | 4-amino-2',6'-dinitro-diphenylamine-4'-sulfonic acid | 5.0 | reddish brown |
| 14 | '' | 4-amino-2'-nitro-3-methyl-diphenylamine-4'-sulfonic acid | 5.0 | medium brown |
| 15 | '' | '' | 4.0 | medium brown |
| 16 | '' | 4-amino-5'-chloro-4'-nitro-diphenylamine-6'-sulfonic acid | 3.0 | bluish brown |
| 17 | '' | '' | 5.0 | dull brown |
| 18 | '' | 4-amino-4'-nitro-3-methoxy-diphenylamine-6'-sulfonic acid | 3.0 | olive brown |
| 19 | '' | '' | 5.0 | brown having an olive tinge |
| 20 | '' | '' | 6.0 | brown having an olive tinge |

What is claimed is:
1. In a process of the preparation of acid nitro dyestuffs by condensation of a benzoquinone with an aminonitrodiphenylaminesulfonic acid in the presence of manganese dioxide which comprises condensing 1 mol of a benzoquinone of the formula in which $m$ is 1 or 2 and the benzene nuclei A and B may be substituted by chlorine, bromine, lower alkyl or lower alkoxy, the improvement consisting of carrying out the condensation at a pH-value of from 3 to 6.